B. T. WILSON & W. F. RATCLIFF.
DEVICE FOR FILLING ICE CREAM CONES.
APPLICATION FILED JUNE 15, 1909.
1,062,940.
Patented May 27, 1913.
2 SHEETS—SHEET 2.
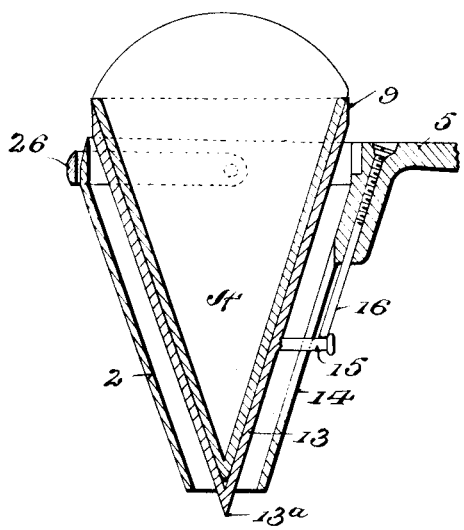
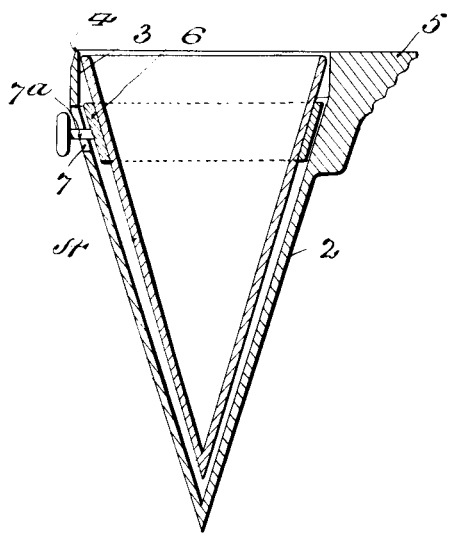
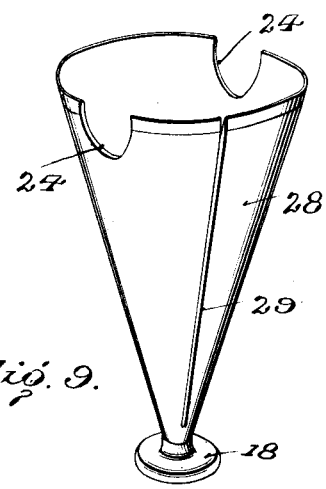
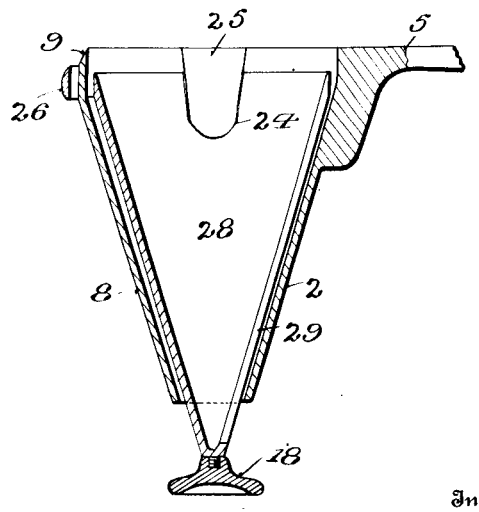
Witnesses
Juana M. Fallin
Cora A. Handy
Inventors
B. T. Wilson
W. F. Ratcliff
By
Attorneys

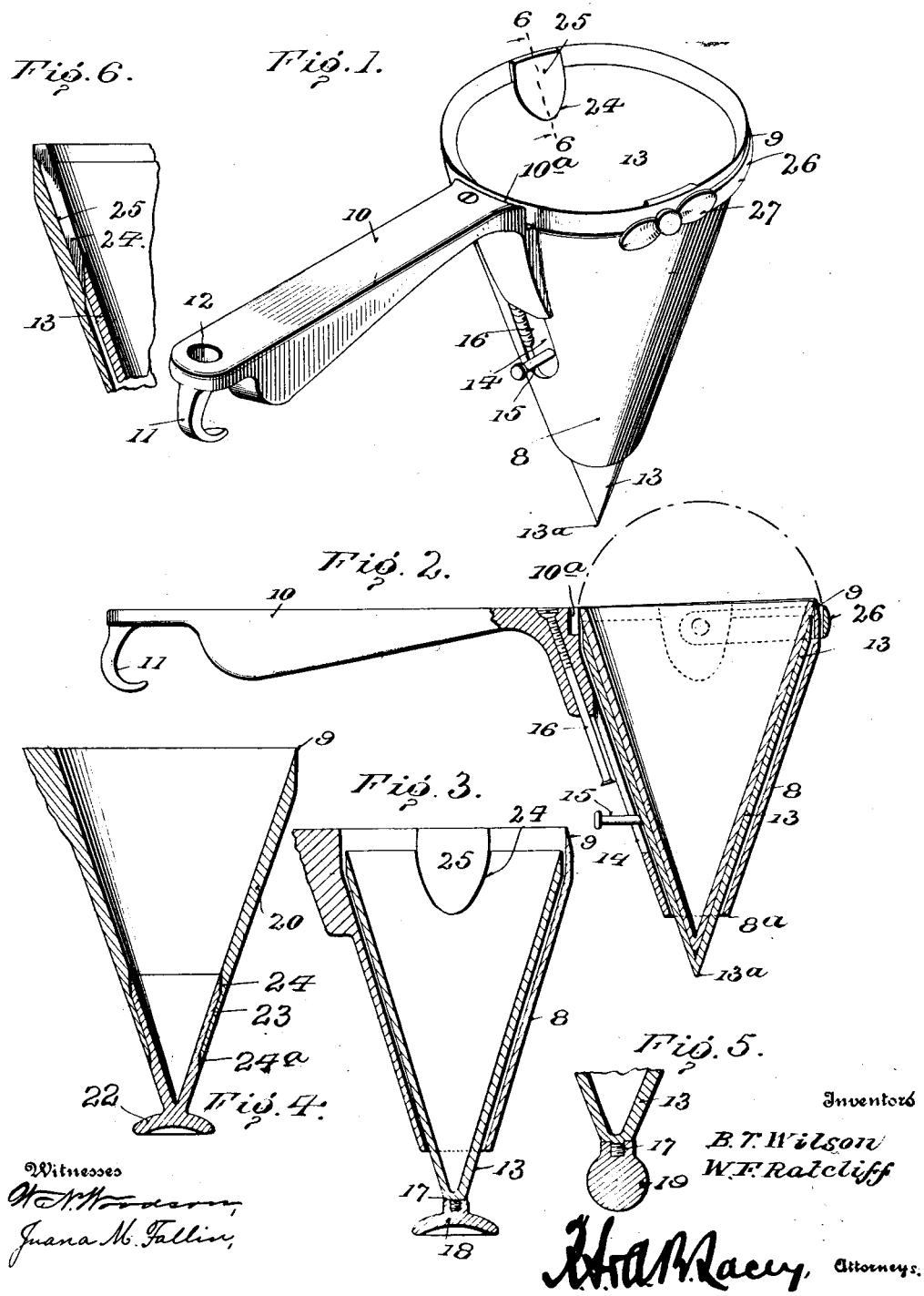

UNITED STATES PATENT OFFICE.

BEN T. WILSON AND WILTON F. RATCLIFF, OF NACOGDOCHES, TEXAS.

DEVICE FOR FILLING ICE-CREAM CONES.

1,062,940.    Specification of Letters Patent.    Patented May 27, 1913.

Application filed June 15, 1909. Serial No. 502,260.

*To all whom it may concern:*

Be it known that we, BEN T. WILSON and WILTON F. RATCLIFF, citizens of the United States, both residing at Nacogdoches, in the county of Nacogdoches and State of Texas, have invented certain new and useful Improvements in Devices for Filling Ice-Cream Cones, of which the following is a specification.

This invention relates to devices for holding ice cream cones when being filled. These cones consist of a thin conical shell of pastry or other material of an edible nature, more or less fragile and weak, which have to be carefully handled and are usually filled by holding the cone in the hand and then putting ice cream into the cone with a spoon or other instrument.

This invention provides means for handling cones without danger of breakage permitting the cones to be dipped into the ice cream and filled and permitting the ice cream to be forced into the cone with considerable pressure without damage to the cone or to the edges of the cone, provides means for delivering or ejecting pastry cone from the holder, and means for striking off the ice cream over the top of the cone whereby a certain definite quantity may be delivered and at the same time the protruding portion of the ice cream nicely rounded off so as to present an attractive appearance.

Further the invention provides means for supporting the cones when being filled and entirely protecting them from contamination by contact with the hands of the vender.

The device is so constructed as to be readily disassembled to permit of a thorough cleaning of the parts, a most necessary measure in devices of this character.

Ice cream cone fillers at present in use provide a device which is inserted into the ice cream, and which drops or ejects its contents of cream in a mass of such size and shape as to properly fit into and fill the pastry cone or a device that is dipped with the cream and filled with it, and then placed within a pastry cone, then opened and then withdrawn from the pastry cone, leaving the ice cream within it. Our invention differs from this, fundamentally, in that the pastry cone is placed within a holder and the cone and holder both are dipped into the cream, the exterior of the cone being protected by the holder, (and the edge of the cone being protected by the holder) and the edge of the cone being protected by the fact that the holder projects beyond or even with the edible cone therefore permitting the cutting edge to be easily passed through the ice cream.

It will be seen from the above that the holder must be at least as long as the cone so that its edge may project even with or beyond the same; hence it is necessary to provide an ejector whereby the cone may be raised sufficiently out of the holder to permit it to be withdrawn without any chance of touching the ice cream. In order to be sanitary the ejecting element should be capable of being entirely withdrawn or disassembled from the holder, but it is preferably so arranged that it will not under ordinary circumstances become detached thus permitting the device as a whole to be hung up and preventing any loss or mislaying of the parts.

In the accompanying drawings we have shown a number of forms of our invention and therein, Figure 1 is a perspective view of one form of our cone filler. Fig. 2 is a side view of the same, the cone holder and ejector being shown in section. Fig. 3 is a sectional view of the holder and a modified form of ejector. Fig. 4 is a diametrical sectional view of another modification of holder and ejector. Fig. 5 is a fragmentary detail view showing a modified manner of forming the stop of the ejector shown in Fig. 3. Fig. 6 is a fragmentary section of the side wall of the holder and the ejector on the line 6—6 of Fig. 1. Fig. 7 is a like view of Fig. 1, only showing the pastry cone raised out of the holder. Fig. 8 is a diametrical sectional view of another form of holder and ejector. Fig. 9 is a perspective view of a modified form of ejecting cup, and Fig. 10 shows the form of ejecting cup shown in Fig. 9 as used in connection with the holder.

The simplest form of our device is shown in Fig. 8 to which reference will now be made. In this figure, 2 designates a holder preferably formed of sheet metal and of any desired shape. Inasmuch as it is common to use conical pastry receivers for ice cream, the holder 2 is made conical but we wish it to be distinctly understood that we may use any desired shape of holder for this purpose. The upper end 3 of the holder, whatever the shape of the body may be, is preferably parallel to the axis of the holder and has a sharpened edge 4, the upper end of the holder being provided with a projecting handle 5 of any desired character. Mounted interiorly of the holder is an ejector 6 which in the form now described, is a ring of metal shiftable up and down within the holder 2 and which is adapted to receive the ice cream cone when lowered into the holder. For the purpose of shifting this cone we slot the holder as at 7 and provide the ejecting ring 6 with an outwardly projecting pin 7ª movable in this slot. The operation of this device will be obvious. The edible cone A is dropped into the holder, the holder having such dimensions relative to the cone that when the cone is dropped in place the edge of the holder will project beyond the edge of the cone. The holder and cone are then inserted into the ice cream, and the cone is filled. After being filled the surplus ice cream is struck from the top of the holder by any desired means. Then by pushing upward on the pin 7ª the ejecting ring is raised, raising with it the cone A until it projects above the edge of the holder, whereupon it may be grasped by the fingers and easily withdrawn. This is an extremely simple form of our device and though it is effective in use it is not as effective as those forms which will be later described.

The principle of our invention having been illustrated by the simple device shown in Fig. 8, reference will now be made to the preferable construction shown in Figs. 1, 2 and 7. In these figures 8 designates the holder of sheet metal also conical in shape for reasons before given, the cone of the holder, however, being frustrated. The holder is formed at its upper end with a sharpened edge 9 as above described and has projecting from one side thereof the handle 10 which is attached to the middle of the holder in any desired manner. This handle at its extremity may be made with a hook 11 and with an eye 12 whereby the device may be easily suspended. Mounted interiorly of the holder 8, is the ejector 13 which in this instance is in the form of a conical cup, the extremity of which projects through the frustrated end of the holder 8 as shown in Fig. 2. When in place within the holder the upper edge of this cone is below the upper edge of the holder and this upper edge of the ejector is preferably sharpened so that it will gradually merge into the wall of the holder, and thus not leave any projecting portions which will be liable to gather cream. The cone A of pastry is adapted to be placed within this conical ejecting cup as shown in Fig. 2, the upper end of the cone being slightly below the upper edge of the holder 8. It being distinctly understood that the edge of the holder may project any desired distance above the edge of the pastry cone so as to give as large or as small a head of cream as is desired on the filled pastry cone. As a means for moving the ejector out of the holder so as to raise the cone therefrom, we slot the side of the holder as at 14 and provide the ejecting cup with a pin 15 which extends out through this slot. This pin forms a stop limiting the upward movement of the ejecting cup and it may also form and preferably does form the means whereby the ejecting cup may be raised out of the holder, though it will be obvious that the cup might be raised from the holder by pushing against the lower end 13ª of the cup.

It is of course desirable that the ejector should be capable of being disassembled from the holder so that the parts may be easily and perfectly cleaned and yet to so construct the device that the holder and ejector are normally prevented from becoming accidentally disassembled. These ends are attained by the use of a screw pin 16 which extends down through the upper end of the holder, preferably through the base of the handle as shown in Fig. 1, and is so arranged as to contact with the pin 15 when the pin is raised, thus preventing any further motion of the holder to such an extent as would permit the ejecting cup and the pin 15 to be removed from engagement with the holder. By removing this screw pin 16, however, the ejecting cup may be raised to the full extent of the slot 14 and then the ejector moved laterally to withdraw the pin 15 from the slot. In its normal position the distance between the pin 15 and the end of the pin 16 should be the same as the distance between the end 13ª of the cup 13 and the end 8ª of the holder 8. Thus the device as a whole may be set upon a table, but the ejector will be moved so as to clear the bottom edge of the holder. The screw pin 16 should be of sufficient size to withstand the strain of the pin 15 knocking up against the end thereof. The screw 16 should be counter-sunk in the handle and have a nick in the top whereby it may be withdrawn. It need only be screw-threaded for a short distance. The extreme lower end of the screw-pin 16 might be enlarged or otherwise formed so that the screw could not be entirely withdrawn and thus lost. It will be seen that this pin 16 in conjunction with pin 15 forms a stop for the ejector and has the same function as the ejector stop previously referred to.

In Figs. 3 and 5 are shown two other forms of stop. These are both of them attached to the bottom end of the cup 13 and form enlargements or flanges on the bottom of the cup of greater diameter than the opening at the bottom end 8ª of the exterior holder 8. These flanges may be formed in any suitable manner, but we have shown the cup 13 as provided with a stud 17 screw-threaded to engage with the heads 18 or 19. The head 18 forms a foot whereby the device as a whole may be supported, but the head 19 is rounded.

While it is preferable to have the ejector of a length practically equal to the length of the holder, yet this is not absolutely necessary and the length of the ejecting conical cup might be short relatively to the conical holder. This is shown in Fig. 4 wherein 20 designates the holder having a frusto-conical shape, the ejector 21 being only about half the length of the holder 20 and extending through the bottom thereof. The pointed extremity of the ejector is enlarged as at 22 so as to form a foot of the same character as the foot 18, this foot, in this case, forming also a stop preventing the ejector from entire detachment from the holder. It is necessary, of course, that the ejector should not project inward beyond the plane of the walls of the holder, nor outward beyond the outer surface of the holder, when the ejector is in its lowered position. For this reason, in this form of our device, we preferably recess the lower end of the holder as at 23, the upper end of this recess being formed with an annular wall 23ª which is parallel with the axis of the holder, and the lower end of the recess being also formed with a wall 23ᵇ parallel to said axis, thus permitting the ejecting cup to move in a straight line upward sufficient to raise the pastry cone above the edge of the holder and permit its removal.

In order to facilitate the removal of the pastry cone A from the ejecting cup we form the latter with semi-circular cut-out portions 24 on its upper edge. These when the ejecting cup is raised above the holder, permit the fingers of the operator to grasp the cone of ice cream on each side so as to easily remove it from the ejecting cup. This construction, however, provides a ledge or projecting edge around the cut-out portion 24 and hence the upper end of the holder is preferably provided at its opposed points with downwardly beveled lugs 25, which when the ejector is in place, fill the openings 24 so that the interior surface of the ejector is practically unbroken. It is obvious that the ice cream within the cone might be "struck" by passing a knife blade or other instrument across the end of the cone and holder, or by passing the cutting edge of holder along or across the sides or edges of the ice cream freezer or other receptacle containing the ice cream or other substance. The custom of the trade however, is to fill the ice cream cones so that the ice cream is rounded over the top of the same. For the purpose of affording means whereby the ice cream may be struck in a regular curve so as to present a pleasing appearance, we provide the arcuate striker or blade 26, which is pivoted at its ends to the holder 8 as shown in Fig. 1. This curved blade is adapted to be rotated upon its pivot over the top of the ice cream and to cut the ice cream in a rounded formation. As a means of rotating this blade we provide on the axis thereof a wing piece 27. We do not wish to limit ourselves to this however. It will be obvious that a plurality of these cutting blades might be used, each of the same character as that shown, but of smaller or larger size whereby the ice cream could be given different sized or shaped heads. This has not been shown for the reason that these cutting blades would simply be duplicates of each other. In order to provide means for accommodating the blade when it is turned transversely to the axis of the holder, we form the handle 10 at its juncture with the holder with a slit 10ª into which the blade may be received.

It is of course very desirable that the interior pastry cone should be easily detached from the ejector cone, so that the two cones will not cling together. This is accomplished by the construction shown in Figs. 9 and 10 which show an ejector cone 28 made of resilient metal or other suitable material and which is split or slitted as 29, for a portion of its length or for its whole length. This ejector is shown as provided with a foot or stop 18, or the slitted ejector may be used with any form of stop other than the foot 18. The upper end of the cone 28 is also shown as cut away to provide the cut-out portions whereby the pastry cones may be removed from the ejector. The operation of the ejector shown in Fig. 9 is as follows: The holder or outer cone 8 should be accurately made so that when this inside slitted ejector cup or cone was pressed down into it, the ejector shall be compressed and the slit closed, but after the pastry cone is filled and this interior metal ejecting cup is forced upward out of the holder, the cup will spring open, thus making an additional effective means for loosening the pastry cone in the ejector cone.

While we have shown the exterior holder as solid so that the cone has to be dropped into the same, we do not wish to be limited to this, as it will be obvious that the holder might be made in two parts hinged together and the cone placed therein, the two parts brought together, thus engaging the cone, and then the cone dipped into the ice cream, the upper edge of the cone holder protecting the upper edge of the cone, precisely as above described.

In operation, the pastry cone will be placed within the filler in the position shown in the drawing, that is, within the ejector. The filler would then be dipped into the cream and the cutting edge of the holder will cut the cream neatly. After filling the cone the curved blade will be moved across the top of the ice cream to form the rounded head thereon, or the cream may be struck or rounded off in any size, shape or form by any desired means. When the cone is filled the bottom should be tapped lightly on the counter which forces the ejector upward. In this movement, the cutting edge of the ejector would cut the cream loose from the inside of the top edge of the cone holder, and the top edge of the ejector cup would extend slightly above the top edge of the holder and the edge of the pastry cone would extend slightly above the top edge of the ejector cone, so that the pastry cone can be easily moved out of the ejector, and the ejector drop out into place ready for use again.

Our device provides a metal receptacle which thoroughly braces and protects the pastry cone so that it cannot be broken or damaged when the cream or other confection is forced into it, under the pressure necessary to fill the pastry cone. The device provides a speedy and easy manner of filling the cone and moreover the conical receptacle can be filled to any desired depth, this depth being entirely within the control of the operator. The cone can be filled a very slight depth from the top or filled down to its bottom extremity, depending entirely upon the amount of cream or other substance which is dipped or scooped up and forced downward into the cone.

We are aware that devices have been made for filling pastry cones which consist of dipper-like receptacles which are adapted to be dipped down into the cream and the cream then poured or otherwise forced into the cone. Practically speaking our device differs from these other devices in that we place the pastry cone inside of an exterior protecting cone or holder.

We do not wish to be limited to the exact form of holder shown as it is obvious that holders may be made of different shapes than conical, it being sufficient that the metal protecting receptacle or holder be provided of the same shape as the pastry receptacle, into which the pastry receptacle can be placed and by which it will be entirely protected. We of course do not wish to be limited to the use of our device with ice cream, as it is obvious that it can be used in any situation to which it is adapted. Also we do not wish to be limited to a receptacle made of metal, as it is obvious that in some situations it might be desirable to make the device out of other materials which might be more desirable for use in that particular situation. We also want it distinctly understood that we do not wish our invention limited to use only with receptacles made of pastry or receptacles of an edible nature. It is obvious that our invention would be useful and valuable for, and adapted to, the filling of any receptacle that was of a more or less fragile, unstable or weak nature, intended as a receptacle for ice cream or similar confections or substances, into which it was desirable to place or force ice cream or any other confection or substance of a similar consistency or of a soft or jelly-like or putty-like nature. Such a receptacle could be made of paper or pasteboard or cardboard, or any material of a similar nature, it being sufficient that the receptacle was of a more or less pliable, breakable, or weak or fragile nature such as to make it desirable that it be braced and supported and protected by a device such as our invention, while the cream or other substance was being dipped, scooped or forced into it by means of a device such as our invention.

Having thus described the invention, what is claimed as new is:—

1. A filling support for frangible cones, including a cone holder adapted to entirely inclose and sheathe said cone and formed with a cutting edge projecting beyond the pastry receptacle when the latter is in place, an ejector located within the holder and adapted to receive and engage the receptacle, means attached to the ejector and projecting through the holder for moving the ejector relatively to the holder to raise the an ejector located within the holder and adjustable stop for limiting the movement of the ejector relative to said holder.

2. A filling support for pastry receptacles, including a holder adapted to inclose and sheathe said receptacle, and an ejector located within the holder and relatively movable thereto, said ejector being adapted to receive the pastry receptacle, the upper end of the ejector being cut away at opposite points of its diameter to provide finger holds whereby the pastry receptacle may be withdrawn from engagement with the ejector.

3. A filling support for pastry receptacles, including a holder adapted to inclose and insheath said receptacle, said holder, when the receptacle is in place, extending to or beyond the edge of the same, thereby protecting said edge, and an ejector located within the holder and relatively movable thereto, said ejector being adapted to receive the pastry receptacle, the upper end of the ejector being cut away at opposite points of its diameter to provide finger holds whereby the pastry receptacle may be withdrawn from engagement with the ejector.

4. A filling support for pastry receptacles, including a holder adapted to inclose and insheath said receptacle, said holder being longer than the receptacle to provide a projecting end, when the receptacle is in place, thereby protecting the edge of the receptacle, and an ejector located within the holder and formed with cut-out portions on its upper edge to permit the receptacle to be withdrawn from the ejector, the said holder on its upper edge being formed with bevel-faced lugs filling the cut-out portion of the ejector when the latter is inserted to its full extent in the holder.

5. A filling support for pastry receptacles, including a conical holder, and a conical ejector located within said holder, the larger end of the holder having its walls parallel to the longitudinal axis of the holder and provided at opposite points with inwardly projecting lugs whose faces are parallel to the longitudinal axis of the holder, said ejector having cut-out portions upon its larger end, into which said lugs project when the ejector is in place.

6. A filling support for pastry receptacles, including a holder having a handle thereon, an adjustable and removable stop pin extending downward through said handle parallel to the wall of the holder, and an ejector located within the holder and shiftable relative thereto, said ejector having a pin extending out from a slot in the holder and engageable with the end of said stop pin.

7. A filling support for pastry receptacles, including a frusto-conical holder open at its smaller end, the larger end of the holder being formed with walls parallel to the longitudinal axis thereof and with a cutting edge thereon, a conical ejector located within the holder but shiftable relatively thereto, the smaller end of the ejector projecting through the open small end of the holder, a pin projecting from the ejector out through a slot in the holder, a handle on the holder, and a screw pin extending out through said handle parallel to the wall of the holder and adapted to contact with the pin on the ejector for limiting the movement of the latter.

8. A filling support for pastry receptacles, including a holder having a frusto-conical shape, and a conical ejector located within the holder but shiftable relatively thereto, said ejector being formed of resilient metal split longitudinally at one point in its diameter so that the ejector may expand when forced upward from the holder to permit the easy withdrawal of the said pastry receptacle.

9. A filling device for pastry receptacles including a frusto-conical holder adapted to entirely inclose and sheathe said receptacle and having a smooth continuous exterior face, the lower end of the holder being open, a conical ejector located within the receptacle and having its lower end projecting through the holder, the lower end of the ejector below the holder being provided with an outwardly extending foot of greater diameter than the opening in the holder, said foot constituting a support for the ejector and holder and also constituting a stop.

10. A filling device for pastry receptacles including a frusto-conical holder adapted to entirely inclose and sheathe said receptacle and having a smooth continuous exterior face, the lower end of the holder being open, a conical ejector located within the receptacle and having its lower end projecting through the holder, the lower end of the ejector below the holder being provided with an outwardly extending foot of greater diameter than the opening in the holder, said foot being detachable from the ejector to permit the removal of the ejector.

In testimony whereof we affix our signatures in presence of two witnesses.

BEN T. WILSON. [L. S.]
WILTON F. RATCLIFF. [L. S.]

Witnesses:
SAM STIRPLING,
W. R. HOWARD.